Sept. 4, 1956  G. A. DU ROCHER  2,761,995
AUTOMATIC HEADLIGHT REGULATING DEVICE
Filed Jan. 23, 1953  2 Sheets-Sheet 1
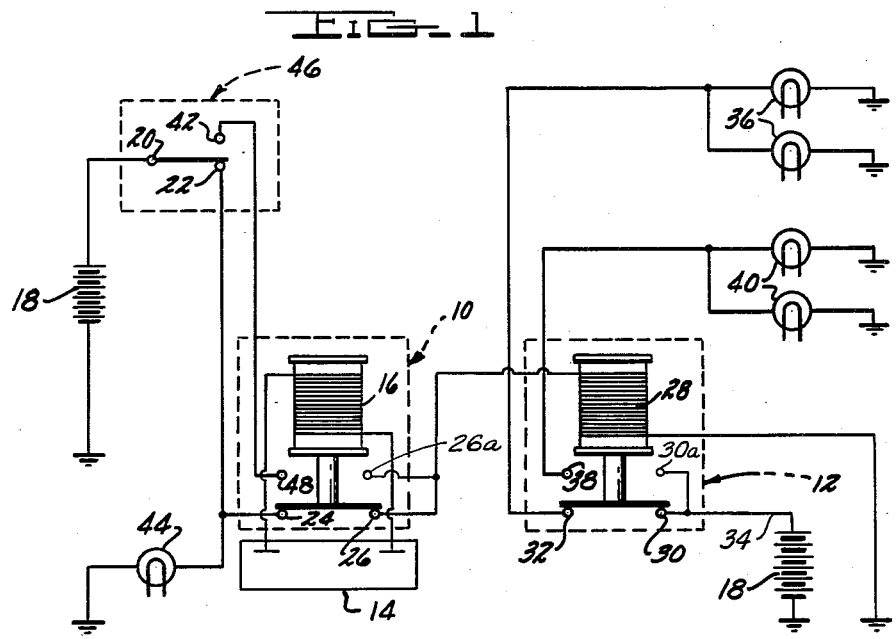
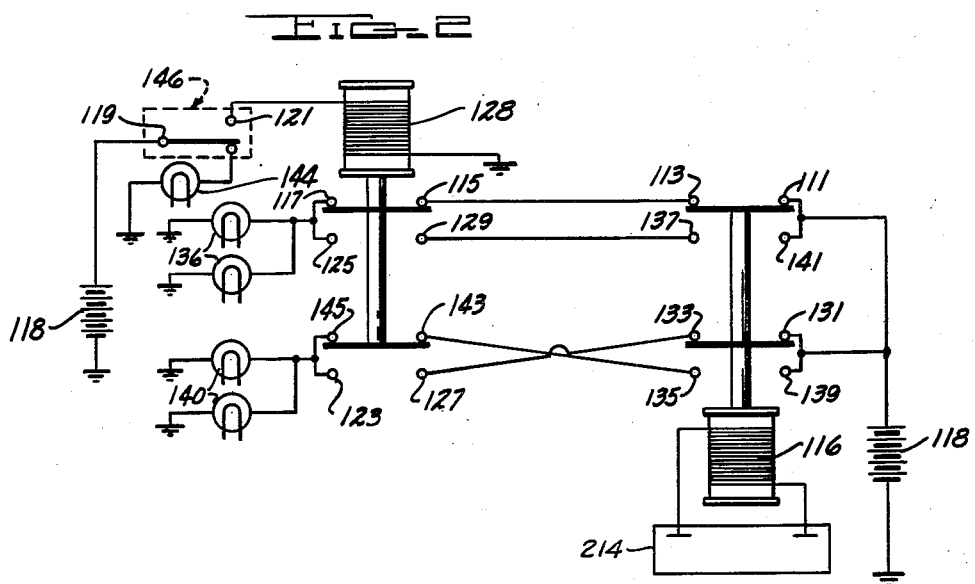
INVENTOR.
GIDEON A. DU ROCHER
BY
Smith and Olsen
ATTORNEYS

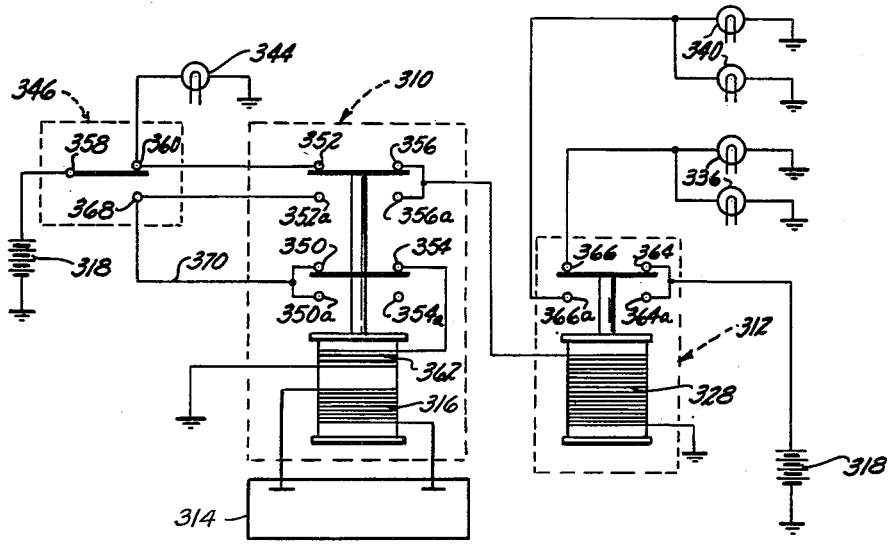
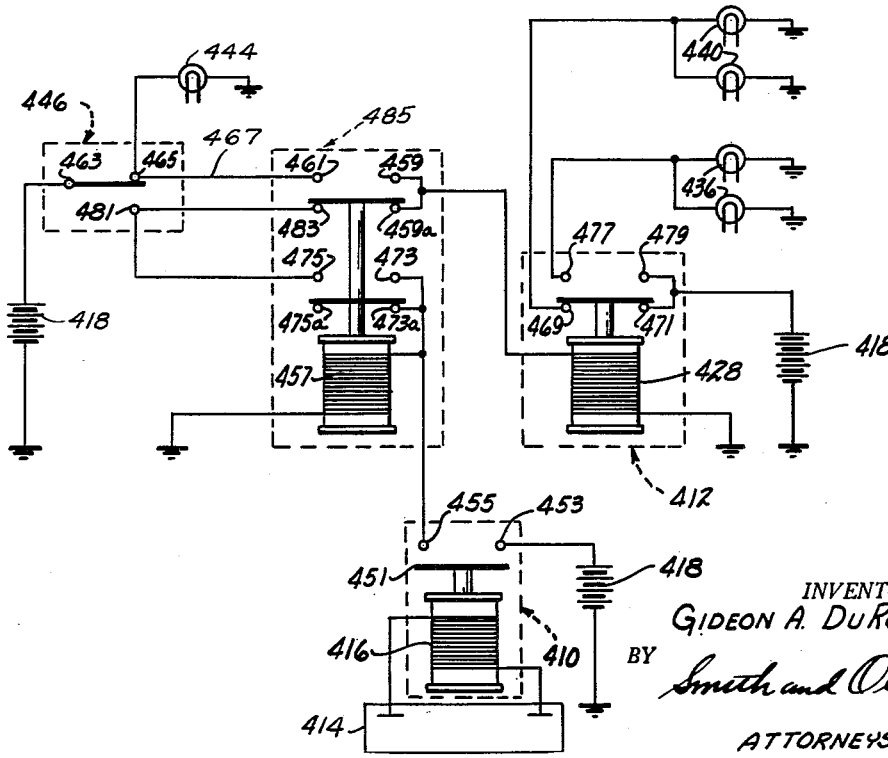

United States Patent Office 2,761,995
Patented Sept. 4, 1956

2,761,995

AUTOMATIC HEADLIGHT REGULATING DEVICE

Gideon A. Du Rocher, Grosse Pointe Farms, Mich., assignor to Essex Wire Corporation, Detroit, Mich., a corporation of Michigan Application January 23, 1953, Serial No. 332,903

3 Claims. (Cl. 315—83)

This invention relates to means operable by the driver of a motor vehicle to energize the bright headlights of his vehicle, or the dim headlights, when said headlights are otherwise under the control of an automatic headlight regulating device.

Automatic headlight regulating devices for motor vehicles are generally based upon an electronic circuit which includes a radiation responsive device commonly called an "eye." When the lights of an approaching vehicle impinge on this eye, the electrical or other disturbance within the eye is amplified to serve as a control means, as for example, to allow more electric current to flow in a circuit or to stop current already flowing. In the case where light impinges on the eye, the circuit is normally adapted so that the high-beam headlights on the vehicle are de-energized and the dim headlights are energized. Certain types of automatic headlight regulating devices are disclosed in United States Patent No. 2,598,420, G. W. Onkson, Jr., and in United States Patent No. 2,380,486, Floyd Willis, Jr.

A common objection to the use of such devices is that the operator does not have complete control over the lights of his vehicle. The headlight filaments are under the control of the dimming device, and at times this creates a dangerous driving hazard. One example of such a hazard arises from the fact that such devices, by nature, are sensitive to any light irrespective of the source. Thus, lights and reflections from the roadside result in frequent "nuisance" operations of the automatic headlight regulating device. If the operator needs his bright lights at the precise moment that his lights go dim, in response to an extraneous light impinging on the eye, as when negotiating a curve or approaching an obstacle, the operator is subjected to a hazardous driving condition. He cannot make the instantaneous, accident saving switch to his bright lights for better visibility, which is possible with the ordinary manual system comprising a standard foot dimmer switch and circuit for alternating the headlights from dim to bright and bright to dim. In other instances the operator may want to dim his lights when the automatic device is holding the lights on bright. This may be the case when overtaking a vehicle. In such a case, the automatic headlight regulating device under automatic operation remains on bright, thereby distracting or annoying the driver of the vehicle ahead and creating a hazardous condition.

Thus, the automatic headlight regulating devices are not properly responsive to the many driving hazards associated with ordinary driving. The safe use of such automatic headlight regulating devices requires that the operator be able to assume instant control of the automatic headlight regulating device at all times. Otherwise the device itself becomes a driving hazard.

The need as expressed by the automotive industry, is for an automatic device wherein the standard foot dimmer switch can be used to reverse the operation of the automatic device. It is desirable that irrespective of what lights are called for by the device, the foot dimmer switch can be struck to reverse such demand. The use of the foot dimmer switch is important because of the universal familiarity of drivers with this switch. Every driver instinctively depresses the foot dimmer switch to reverse his lights. It is this split second recovery that is desirable when the automatic device trips the headlights at the wrong moment.

It is, therefore, a principal object of this invention to provide operator control of automatic headlight regulating devices so that the vehicle operator can at will, obtain the desired headlight adjustment at any instant and without regard to the auomatic headlight regulating device.

It is also an object of this invention to provide a system wherein a standard foot dimmer switch can be used in a normal manner to reverse the operation of an automatic headlight regulating device or override such a device at any time.

Other objects of this invention will appear in the following description and appended claims, reference being had to the accompanying drawings forming a part of this specification wherein like reference characters designate corresponding parts in the several views.

In the drawings:

Fig. 1 is a schematic diagram showing the application of the reversing principle to an automatic dimming device of the type which employs an auxiliary relay and a filament selector relay.

Fig. 2 is a schematic diagram showing the application of the reversing principle to an automatic dimming device which combines the auxiliary and filament selector relay.

Fig. 3 is a schematic diagram of a modification of the construction shown in Fig. 1.

Fig. 4 is a schematic diagram of another modification.

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation. It makes no difference in the function of the circuits claimed whether single break or double break contacts are used.

In general, the reversing circuit involves a pair of single pole, double throw switches, one manually and the other magnetically operated, which open or close a relay circuit contrary to a prior opening or closing of the relay circuit by the automatic device.

The operation of the circuit can be best understood by reference to the basic circuit shown in Fig. 1. In this instance the automatic headlight regulating device comprises the auxiliary relay 10 and the filament selector relay 12. The auxiliary relay 10 is connected with a photocell unit 14. The photocell signal is of minute proportions and though amplified, the signal is relatively weak. Thus in the type of device illustrated the relay 10 is a hypersensitive relay which responds to the weak signal. Relay 12 is used in conjunction therewith, relay 12 being the relay which actually selects the headlight filaments to be energized.

In Fig. 1, the auxiliary relay 10 is shown in the energized position. The coil 16 is presumed as being energized or de-energized dependent upon the dictates of the plate current of an amplifier tube such as is used in conventional electronic regulating circuits. With coil 16 of the auxiliary relay energized, as shown, current flows from the power source 18, through contacts 20, 22, 24 and 26, and coil 28 of the filament selector relay 12. The energization of the coil 28 results in the bridging of the contacts 30 and 32, as shown, and current flows from the power source 18 through the lead 34 to the filaments 36, representing the bright lights of the vehicle. In normal operation of the automatic regulating device, de-energization of coil 16 opens the contact 24 and the circuit through coil 28 of the filament selector relay 12. Relaxation of the filament selector relay 12 causes a bridging of the contacts 30a and 38 which closes the circuit from the power source 18 through lead 34 to the filaments 40 representing the dim lights of the vehicle.

Reversal of the demands of the automatic regulating device is achieved by inserting in the filament selector relay circuit a foot dimmer switch 46 adapted for manual and selective bridging of the contact 20 with the contacts 22 and 42. As shown, the automatic regulating device operates without interruption as hereinbefore described. The indicator light 44 shows that the foot dimmer switch 46 is in position to allow normal automatic operation. When the auxiliary relay 10 demands bright lights, as aforesaid, striking the foot dimmer switch 46 opens the filament selector relay coil circuit by breaking the contact at 22. The filament selector relay 12 relaxes opening the contact 32 and bridging the contacts 30a and 38. Current flows from the power source 18 through lead 34, contacts 30a and 38, and the filaments 40 of the dim lights are energized. Thus, when the automatic regulating device calls for bright lights, dim lights may be obtained by striking the foot dimmer switch 46.

If coil 16 is de-energized, normally calling for dim lights in the automatic headlight regulating device illustrated, the auxiliary relay 10 relaxes bridging the contacts 26a and 48. Striking the foot dimmer switch 46 will cause a bridging of contacts 20 and 42, closing the circuit through coil 28 of the filament selector relay 12. Energization of coil 28 results in the bridging of contacts 30 and 32 which energizes the filaments 36 representing the bright lights. It is thus seen that when the automatic headlight regulator device demands dim lights, the foot dimmer switch 46 can be depressed to obtain bright lights. Therefore, irrespective of the demands of the automatic headlight regulating device, the standard foot dimmer switch 46 can be used to reverse the demands of the device.

It has been specified that the foot dimmer switch be in a given position for normal automatic operation. It can be seen by reference to Fig. 1, that when the foot dimmer switch 46 bridges contacts 20 and 42, and contacts 26a and 48 are bridged due to the relaxation of the auxiliary relay 10, a circuit will be completed from the power source 18 through contacts 20, 42, 48, and 26a, through the coil 28. This circuit will respond to coil 16 in such a manner as to reverse normal automatic operation. However, in such event, depressing the foot dimmer switch 46 will restore normal automatic operation.

Fig. 2 illustrates the application of the reversing principle to an automatic headlight regulating device which combines the auxiliary relay with the filament selector relay. In this case, a relay is incorporated into the foot dimmer switch circuit to effect the reversal of the automatic device.

Fig. 2 shows coil 116 energized as dictated by the plate current of an amplifying tube such as used in conventional electronic circuits. Current flows from the power source 118 through the contacts 111, 113, 115, 117 and the filaments 136 representing the bright lights of the vehicle. If dim lights are desired, the foot dimmer switch 146 is struck by the operator, thereby bridging the contacts 119 and 121 and energizing coil 128. Energization of coil 128 causes the bridging of contacts 123 and 125 with contacts 127 and 129 respectively. Current flows from the power source 118 through the contacts 131, 133, 127, 123, and energizes the filaments 140, which represent the dim lights. Thus dim lights can be obtained by striking the dimmer switch 146 when the automatic device demands bright lights. In the case where coil 116 is de-energized, contacts 135 and 137 are bridged with contacts 139 and 141 respectively. Current flows from the power source 118 through contacts 139, 135, 143, 145 and energizes the filaments 140 representing the dim lights of the vehicle. If bright lights are required by the operator, the foot dimmer switch 146 is depressed to bridge the contacts 119 and 121. The coil 128 is thereby energized which causes a bridging of the contacts 123 and 125 with the contacts 127 and 129 respectively. Current flows from the power source 118 through the contacts 141, 137, 129, 125 and energizes the filaments 136 which represent the bright lights of the vehicle. Thus when the automatic device calls for dim lights, bright lights are obtained by use of the standard foot dimmer switch. The indicator light 144 is used to indicate when the foot dimmer switch is in position for normal operation of the automatic headlight regulating device.

Fig. 3 embodies an added feature to the basic reversing circuit of Fig. 1. The vehicle operator may have occasion to manually dim his lights and hold such dim lights, as in city driving or when approaching an oncoming vehicle outside the sensitive range of the automatic headlight regulating device. In Fig. 1 depression of the foot dimmer switch 46 will cause a bridging of contacts 20 and 42. When the light intensity becomes sufficient to render the automatic dimmer operative, the contacts 48 and 26a will be bridged thereby closing the relay circuit through the slave relay coil 28. The bright light filaments 36 will be energized with the energization of coil 12, which in turn requires that the operator strike the dimmer switch 46 a second time. To meet this type of situation, a holding coil is introduced in the modification shown in Fig. 3 which avoids the necessity of striking the dimmer switch a second time in such a situation.

In Fig. 3, as shown, the foot dimmer switch 346 is in position for normal automatic operation. The coil 316 in the auxiliary delay 310 is energized or de-energized dependent upon the demands of the electronic circuit of the automatic headlight regulating device. As shown, the auxiliary relay 310 is in the energized position. The contacts 350 and 352 are bridged respectively to contacts 354 and 356. The foot dimmer switch 346 is in position for normal automatic operation, wherein contacts 358 and 360 are bridged, as indicated to the operator by the indicator light 344. With the foot dimmer switch 346 in position for normal automatic operation, the operation of the circuit is the same as that described in the basic circuit of Fig. 1. The difference in the two circuits is represented by the holding coil 362. This holding coil 362 avoids, as indicated previously, a possible flashing of bright lights when the headlights have been manually dimmed, due to the operation of the automatic headlight regulating device which requires a second manual operation of the foot dimmer switch.

The operation of the holding coil 362 is as follows: In the circuit, as shown, the current is flowing from the power source 318 through contacts 358 and 360, through contacts 352 and 356, and through coil 328, thereby energizing said coil. Energization of coil 328 results in a bridging of contacts 364 and 366 with a resultant current flow from the power source 318 through the bright filaments 336. The circuit through the coil 328 is opened by either manual operation of the foot dimmer switch 346 to break the contact between contacts 358 and 360 or by the de-energization of coil 316, breaking the contact between contacts 356 and 352, resulting in the energization of filaments 340, as aforesaid, representing the dim lights.

When the bright lights are on as shown in Fig. 3, the breaking of the circuit by the use of the foot dimmer switch 346 results in the bridging of contacts 368 and 358. Current flows from the power source 318 through the contacts 358 and 368, the lead 370 contacts 350, 354, and holding coil 362. The energization of coil 362 provides a sufficient field of force to hold the auxiliary relay 310 closed, bridging the contacts 352 and 356. In the event of de-energization of coil 316, which normally would allow the auxiliary relay 310 to relax, the holding force of the energized coil 362 maintains the positions as shown. Thus, when the bright filaments 336 are energized, the foot dimmer switch 346 can be used to obtain dim lights and such dim lights may be held uninterrupted, for as long as desired by the operator.

It is important to note that all features of the basic circuit are present in this modification in addition to the holding feature. The lights can be dimmed if the automatic headlight regulating device calls for bright lights, or if the automatic headlight regulating device calls for dim lights the dimmer switch can be used to obtain bright lights as when signalling to an oncoming car.

Fig. 4 is a further modification of the basic deversing principle embodying another holding means.

The holding feature in this instance is based upon the use of an auxiliary relay 485 which acts to hold the dim filaments energized upon the depression of the foot dimmer switch. Subsequent operation of the automatic headlight regulating device, as for example, due to the effect of oncoming headlights does not, therefore, operate to reverse the circuit a second time.

As shown the automatic headlight regulating device is operating normally. The intermediate relay 410 is de-energized as dictated by the amplifying circuit of the automatic regulating device. With coil 416 de-energized, the armature 451 is in the relaxed position shown. The circuit, including power source 418, contact 453, contact 455, and coil 457 is therefore opened and the coil 457 is de-energized. With coil 457 de-energized there is no contact between contacts 459 and 461 and the filament selector relay coil circuit including power source 418, contacts 463, 465, lead 467, contacts 461, 459, and coil 428 is open. Coil 428 is de-energized, bridging the contacts 469 and 471 thereby closing the circuit through the dim headlight filament 440. Energization of the intermediate relay coil 416 causes the bridging of contacts 455 and 453. This allows current to flow from the power source 418 through contacts 453 and 455 through the auxiliary relay coil 457. Energization of coil 457 causes the bridging of contacts 461 and 459, and 475 and 473. Current flows from the power source 418 through contacts 463, 465, lead 467, contacts 461, 459, and the film selector relay coil 428. Energization of coil 428 causes the bridging of contacts 477 and 479 which closes the circuit through the bright headlight filament 436.

To manually dim the headlights when the automatic headlight regulating device is calling for bright lights, the foot switch 446 is depressed. Depression of the foot dimmer switch 446 bridges the contacts 463 and 481. This opens the filament selector relay coil circuit which results in the bridging of contacts 469 and 471 closing the circuit through the dim headlight filament 440.

The bridging of contacts 463 and 481 brings into play the holding feature by closing the circuit through the auxiliary relay coil 457. This circuit includes the power source 418, contacts 463, 481, 475, 473, and coil 457. This circuit maintains the coil 457 energized irrespective of the demands of the intermediate relay 410.

Thus, it is impossible for the auxiliary relay to relax from the energized position after depression of the foot dimmer switch. This avoids the completion of a circuit through the contacts 463, 481, 483, 459, and coil 428 which would result in a flashing of bright lights as previously described.

It is important to note that all features of the basic circuit are present in this modification in addition to the holding feature. The lights can be dimmed if the automatic headlight regulating device calls for bright lights, or if the automatic headlight regulating device calls for dim lights the dimmer switch can be used to obtain bright lights as when signalling to an oncoming car.

It should be understood that this invention is capable of various modifications within the scope of the appended claims.

Having thus described my invention, I claim:

1. A headlamp control system for a vehicle comprising in combination: headlamps equipped with high and low beam filaments; an electric power source for energizing said headlamp filaments; a filament selector relay having single pole, double throw contacts to selectively control the connection of said headlamp filaments to said power source, the movable contact of said contacts being connected to the power source, one stationary contact being connected to the high beam filaments, and the second stationary contact being connected to the low beam filaments; a photo-responsive device; an auxiliary relay operable by said photo-responsive device and having single pole, double throw contacts, the movable contact of said auxiliary relay contacts being connected to the coil of the filament selector relay; a foot operated switch having single pole, double throw contacts, the movable contact of said switch contacts being connected to the power source, one switch stationary contact being connected to one auxiliary relay stationary contact, and the second switch stationary contact being connected to the second auxiliary relay stationary contact; one of said relays having, in addition, single pole, single throw, normally open contacts, one of said single throw contacts being connected to a coil on the relay having said single throw contacts, the second contact of said single throw contacts being connected to one of the switch stationary contacts; said circuit connections being such that with the foot operated switch in the position where the second said single throw contact is disconnected from the power source, the auxiliary relay is operable by the photo-responsive device to control the filament selector relay in such a way that the low beam filaments are connected to the power source in the presence of impinging light, and the high beam filaments are connected to the power source in the absence of impinging light, and the high beam filaments are connected to the power source in the absence of impinging light, thereby providing automatic control of the headlamps; said circuit connections being such that, when the foot operated switch is moved to the second position where the second said single-throw contact is connected to the power source, the filament selector relay is energized or de-energized contrary to the prior energization or de-energization, reversing said automatic operation, thereby providing manual control; and said circuit connections being such that if the foot operated switch be in said second position while the low beam filaments are connected to the power source, a connection is made from the power source through contacts of said foot operated switch and the single throw contacts to the coil of said relay having said single throw contacts to hold said relay having said single throw contacts in the actuated position as long as the foot operated switch remains in said second position, thereby maintaining the headlamps in the low beam condition regardless of changes in impinging light.

2. A headlamp control system for a vehicle comprising in combination: headlamps equipped with high and low beam filaments; an electric power source for energizing said headlamp filaments; a filament selector relay having single pole, double throw contacts to selectively control the connection of said headlamp filaments to said power source, the movable contact of said contacts being connected to the power source, the normally closed contact being connected to the low beam filaments, and the normally open contact of said contacts being connected to the high beam filaments; a photo-responsive device; an auxiliary relay operable by said photo-responsive device in the absence of impinging light and having an actuating coil and single pole, double throw contacts, the movable contact of said auxiliary relay contacts being connected to the coil of the filament selector relay; a foot operated switch having single pole, double throw contacts, the movable contact of said switch contacts being connected to the power source, one switch stationary contact being connected to the auxiliary relay normally closed contact, the second switch stationary contact being connected to the normally open auxiliary relay contact; the auxiliary relay having, in addition, a holding coil and single pole, single throw, normally open contacts, one of said single throw contacts being connected to the holding coil, the second contact of said single throw contacts being connected to the auxiliary relay normally closed contact and the first said switch stationary contact; said circuit connections being such that with foot operated switch in the position where the second said single throw contact is disconnected from the power source, the auxiliary relay is actuated by the photo-responsive device in the absence of impinging light, energizing the filament selector relay, and connecting the high beam filaments to the power source, or the auxiliary relay is non-actuated by the photo-responsive device in the presence of impinging light, de-energizing the filament selector relay and connecting the low beam filaments to the power source, thereby providing automatic control of the headlamps; said circuit connections being such that when the foot operated switch is moved to the second position where the second said single throw contact is connected to the power source, the filament selector relay is energized or de-energized contrary to the prior energization or de-energization, reversing said automatic operation, thereby providing manual control; and said circuit connections being such that if the foot operated switch be in said second position while the auxiliary relay is actuated by the photo-responsive device in the absence of light, a connection is made from the power source through contacts of said foot operated switch and the single throw contacts to the holding coil of said auxiliary relay, to hold said auxiliary relay in the actuated position as long as the foot operated switch remains in said second position, thereby maintaining the headlamps in the low beam condition regardless of changes in impinging light.

3. A headlamp control system for a vehicle comprising in combination; headlamps equipped with high and low beam filaments; an electric power source for energizing said headlamp filaments; a filament selector relay having single pole, double throw contacts to selectively control the connection of said headlamp filaments to said power source, the movable contact of said contacts being connected to the power source, the normally closed contact of said contacts being connected to the low beam filaments, and the normally open contact of said contacts being connected to the high beam filaments; a photo-responsive device including an intermediate relay operable by said photo-responsive device and having single pole, single throw contacts normally closed in the absence of impinging light and normally open in the presence of impinging light; one of said single throw contacts being connected to the power source; an auxiliary relay having single pole, double throw contacts, the coil of said auxiliary relay being connected to the second contact of said intermediate relay such that said auxiliary relay is operable by said photo-responsive device and intermediate relay in the absence of impinging light, the movable contact of said auxiliary relay contacts being connected to the coil of the filament selector relay; a foot operated switch having single pole, double throw contacts, the movable contact of said switch contacts being connected to the power source, one switch stationary contact being connected to the auxiliary relay normally closed contact, the second switch stationary contact being connected to the normally open auxiliary relay contact; the auxiliary relay having, in addition, single pole, single throw normally open contacts, one of said auxiliary relay single throw contacts being connected to the auxiliary relay coil, the second contact of said single throw contacts being connected to the auxiliary relay normally closed contact and the first of said switch stationary contacts; said circuit connections being such that with the foot operated switch in the position where the second said auxiliary relay single throw contact is disconnected from the power source, the auxiliary relay is actuated by the photo-responsive device and the intermediate relay in the absence of impinging light, energizing the filament selector relay, and connecting the high beam filaments to the power source, or the auxiliary relay is non-actuated by the photo-responsive device and intermediate relay in the presence of impinging light, de-energizing the filament selector relay and connecting the low beam filaments to the power source, thereby providing automatic control of the headlamps; said circuit connections being such that when the foot operated switch is moved to the second position where the second said auxiliary relay single throw contact is connected to the power source, the filament selector relay is energized or de-energized contrary to the prior energization or de-energization, thereby providing manual control; and said circuit connections being such that if the foot operated switch be in said second position while the auxiliary relay is actuated by the photo-responsive device and the intermediate relay in the absence of impinging light, a connection is made from the power source through contacts of said foot operated switch and the auxiliary relay single throw contacts to the coil of said auxiliary relay to hold the auxiliary relay in the actuated position as long as the foot operated switch remains in said second position, thereby maintaining the headlamps in the low beam condition regardless of changes in impinging light.

References Cited in the file of this patent
UNITED STATES PATENTS
2,431,394  Friedman _____ Nov. 25, 1947